F. Q. HARTMAN.
DRAIN PIPE.
APPLICATION FILED JUNE 3, 1915.
1,259,233. Patented Mar. 12, 1918.
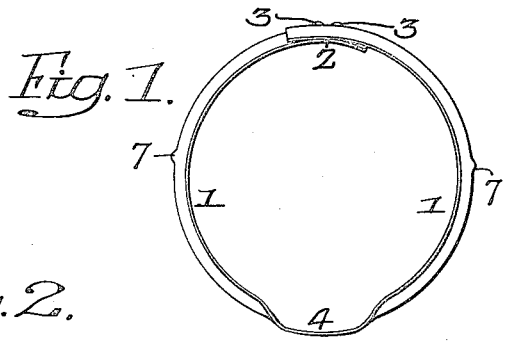
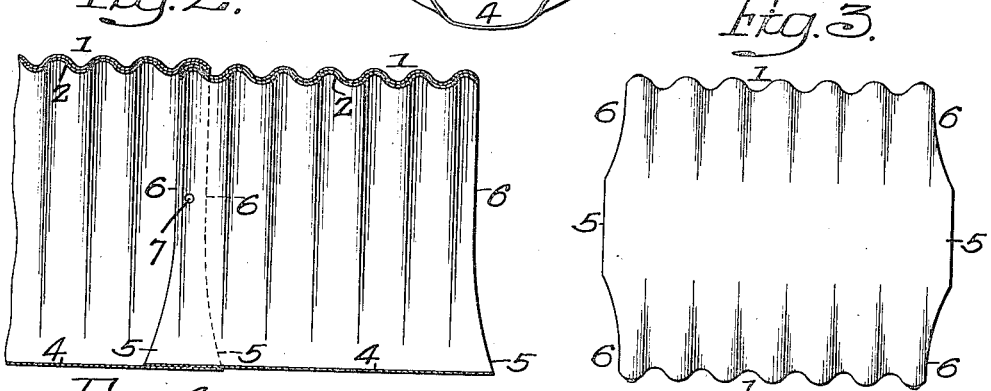
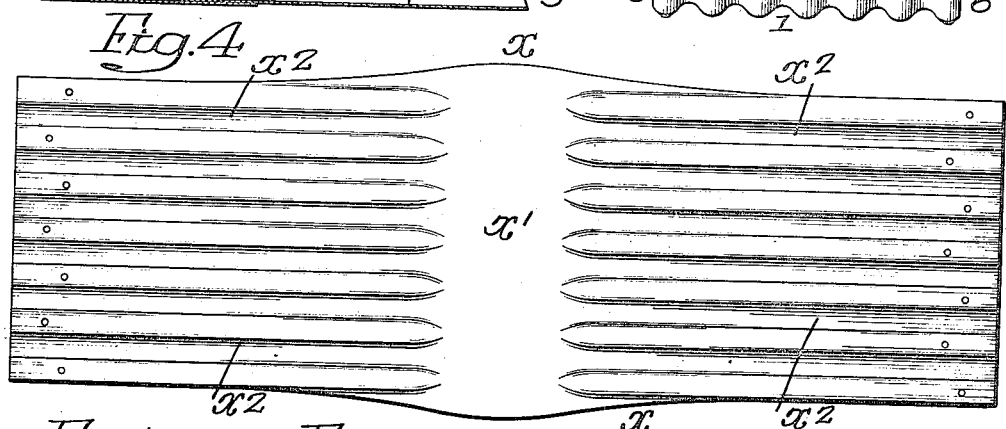
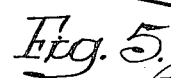
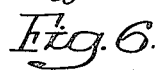
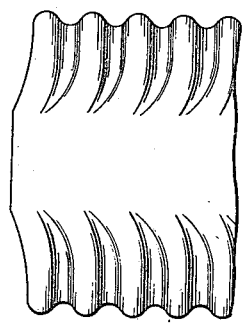
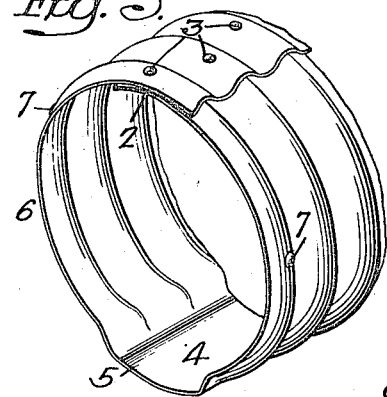
Inventor
Ferdinand Q. Hartman,
by his Attorneys
Howson & Howson

UNITED STATES PATENT OFFICE.

FERDINAND Q. HARTMAN, OF DANVILLE, PENNSYLVANIA.

DRAIN-PIPE.

1,259,233. Specification of Letters Patent. Patented Mar. 12, 1918.

Application filed June 3, 1915. Serial No. 31,921.

*To all whom it may concern:*

Be it known that I, FERDINAND Q. HARTMAN, a citizen of the United States, residing in Danville, Montour county, State of Pennsylvania, have invented certain Improvements in Drain-Pipes, of which the following is a specification.

My invention relates to certain improvements in drain pipes for roadways, gutters, and the like.

One object of the invention is to provide a smooth and comparatively narrow channel in a pipe, the remainder of which is corrugated.

A further object of the invention is to provide a lap joint at the upper end of the pipe so as to avoid shearing strains due to pressure on the roadway in which the pipe is embedded.

A further object of the invention is to make a pipe in which the sections have a greater lap at the base than at the upper portion.

In the accompanying drawings:

Figure 1 is an end view of my improved drain pipe;

Fig. 2 is a longitudinal sectional view;

Fig. 3 is an inverted plan view;

Fig. 4 is a plan view of the sheet from which a section of the drain pipe is made;

Fig. 5 is a perspective view of one end of the drain pipe;

Fig. 6 is a perspective view showing a lock joint between the two sections; and

Figs. 7 and 8 are views of modifications of the invention.

Referring to the drawings, 1 is the drain pipe made from a sheet of metal as clearly shown at $x$, Fig. 4, and the center of the sheet is plain as at $x'$, and the remainder of the sheet has longitudinal corrugations $x^2$. The sheet is bent into cylindrical form, in the present instance, and the ends overlap as at 2 and the rivets 3 which secure the ends together are preferably staggered and there may be any number of rivets, according to the size of the pipe and the thickness of the metal. When the pipe is bent, as shown, the plain portion $x'$ of the blank, Fig. 4, forms a narrow channel 4 and when the sections are coupled together this channel is continuous from one end of the pipe to the other and the bottom of the channel is smooth so as to allow for the free flow of water through the drain pipe. The corrugations extend on each side and at the top, as shown in the drawings, and these corrugations are at right angles to the longitudinal line of the pipe and add materially to the strength and stiffness of the pipe.

I preferably make an extended lap joint at the top, as shown in Fig. 1, so as to increase the strength. This joint is preferably made at the top so as to avoid the shear strains on the rivets which secure the two ends of the blank together to form the pipe. The blank is pressed from a rectangular sheet of metal and, consequently, when the corrugations are formed the metal is drawn in and is less in width at the corrugations than at the plain portion so that when the blank is bent to form a section of pipe the portions 5 at the bottom of the pipe project beyond the ends 6 of the body of the pipe, thus making a much more extended overlap at the bottom of the drain pipe than at the top and materially reducing the seepage through the joints. The channel 4 may be narrow, as illustrated in Fig. 1, or may be of a greater width than shown, or may be narrower than shown, but the proportion shown in Fig. 1 is the preferable proportion. The channel is shown as extending below the body of the pipe, but it may be within the curved line of the pipe as illustrated at $4^a$, Fig. 8, and, in some instances, the corrugations may be made as illustrated in Fig. 7, in which they are turned at the base where they merge into the channel portion so as to direct the water into the channel and toward the outlet end of the pipe.

In order to couple the sections together, I preferably press projections or lugs 7 on the inner section to enter recesses 8 on the outer section, as illustrated in Fig. 6, and these may be used in connection with rivets or bolts, if desired. The object is to make a sectional pipe in which the sections can be quickly and accurately coupled together.

Thus it will be seen that I am enabled to provide a drain pipe in which the major portion of the pipe is reinforced by transverse corrugations and these corrugations merge into a narrow channel, or gutter, at the base of the pipe so as to allow the water, under ordinary conditions, to flow freely over the plain surface of the pipe. This makes a very substantial construction and one which can be cheaply manufactured.

In Fig. 1, I have shown the overlapping ends of the section shaped to form a bearing at the center or rivet point or points and clear at the ends. This prevents the rivets being drawn out when excessive loads are applied at the upper portion of the pipe.

While I have shown the rivets staggered, there may be a single row of rivets or a double row, as desired.

I claim:

The combination of a drain pipe made in sections coupled together, each section having a deep, smooth and narrow channel extending below the central line of the pipe, the balance of the pipe having a series of transverse corrugations merging into the channel, the longitudinal joint of each section of pipe being at the top, the pipe at the channel being of a greater length than the corrugated portion so that when the two sections are coupled together the channel portion of the two pipes will have an extended overlap preventing leaking at the joint and obviating the necessity of making an extended overlap at the balance of the joint.

FERDINAND Q. HARTMAN.